W. I. TWOMBLY.
VARIABLE SPEED POWER TRANSMISSION MECHANISM.
APPLICATION FILED MAR. 12, 1910.
1,018,219.
Patented Feb. 20, 1912.
4 SHEETS—SHEET 1.
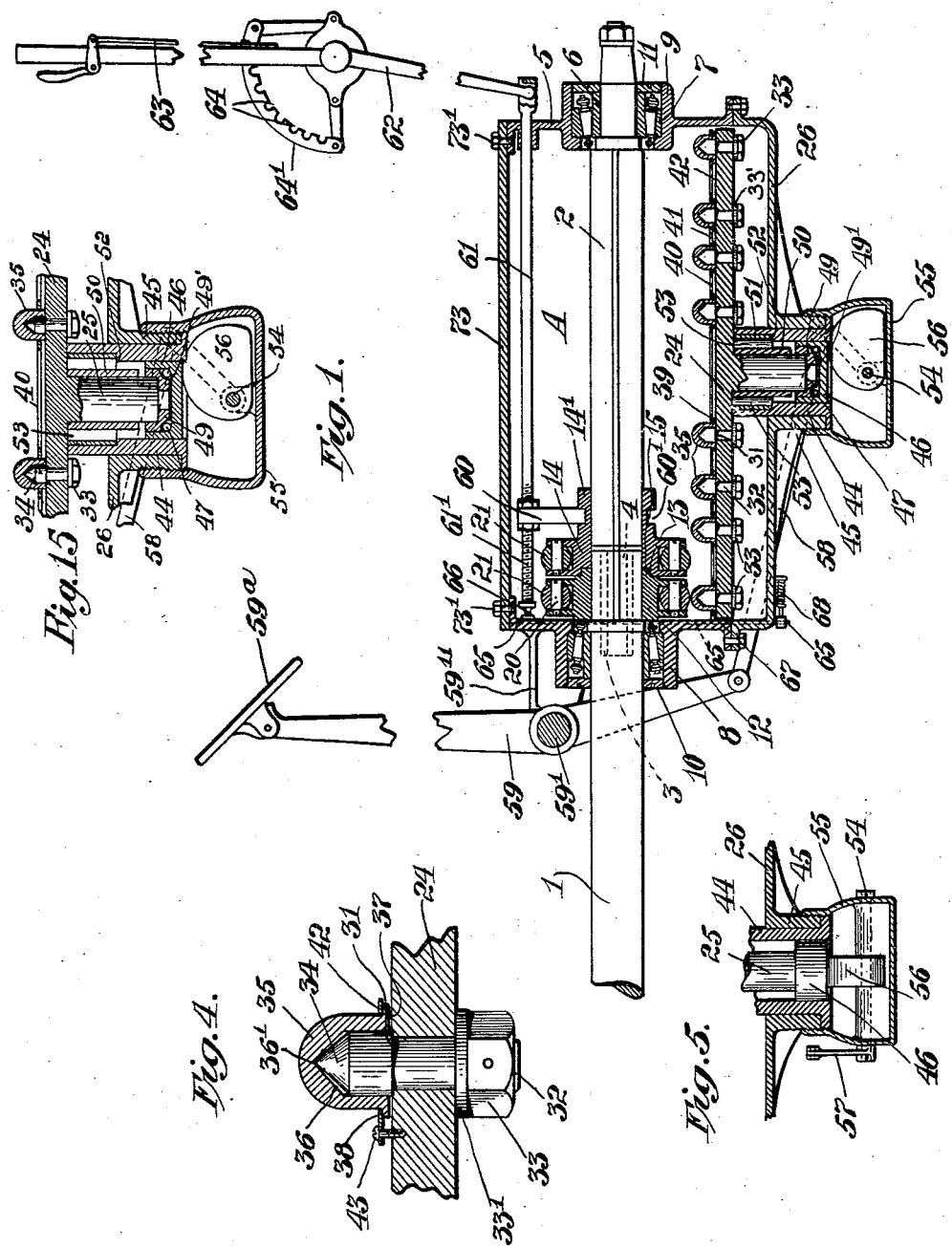
WITNESSES:
INVENTOR:
Willard I. Twombly,
BY
John O. Seifert
ATTORNEY

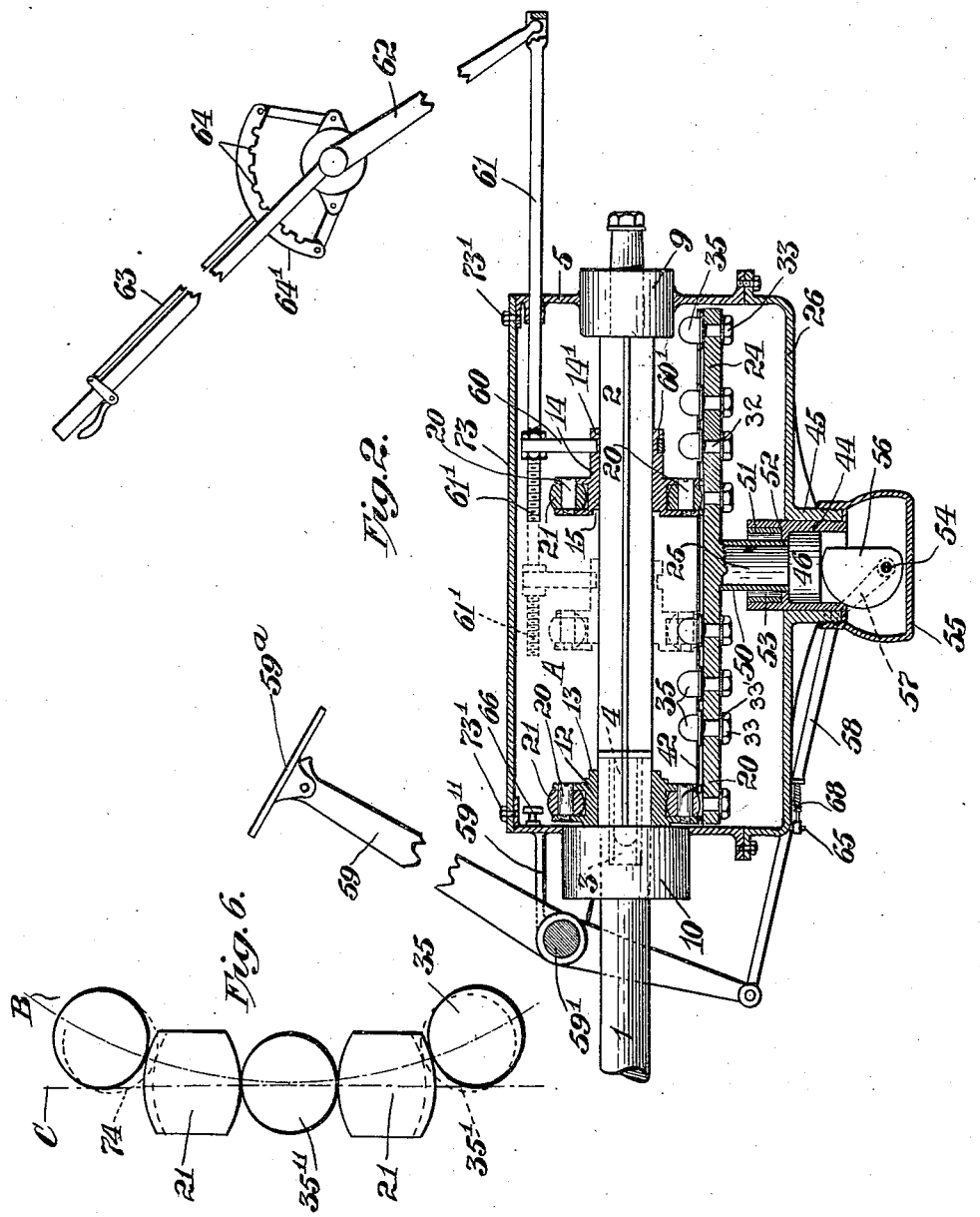

W. I. TWOMBLY.
VARIABLE SPEED POWER TRANSMISSION MECHANISM.
APPLICATION FILED MAR. 12, 1910.
1,018,219.
Patented Feb. 20, 1912.
4 SHEETS—SHEET 3.
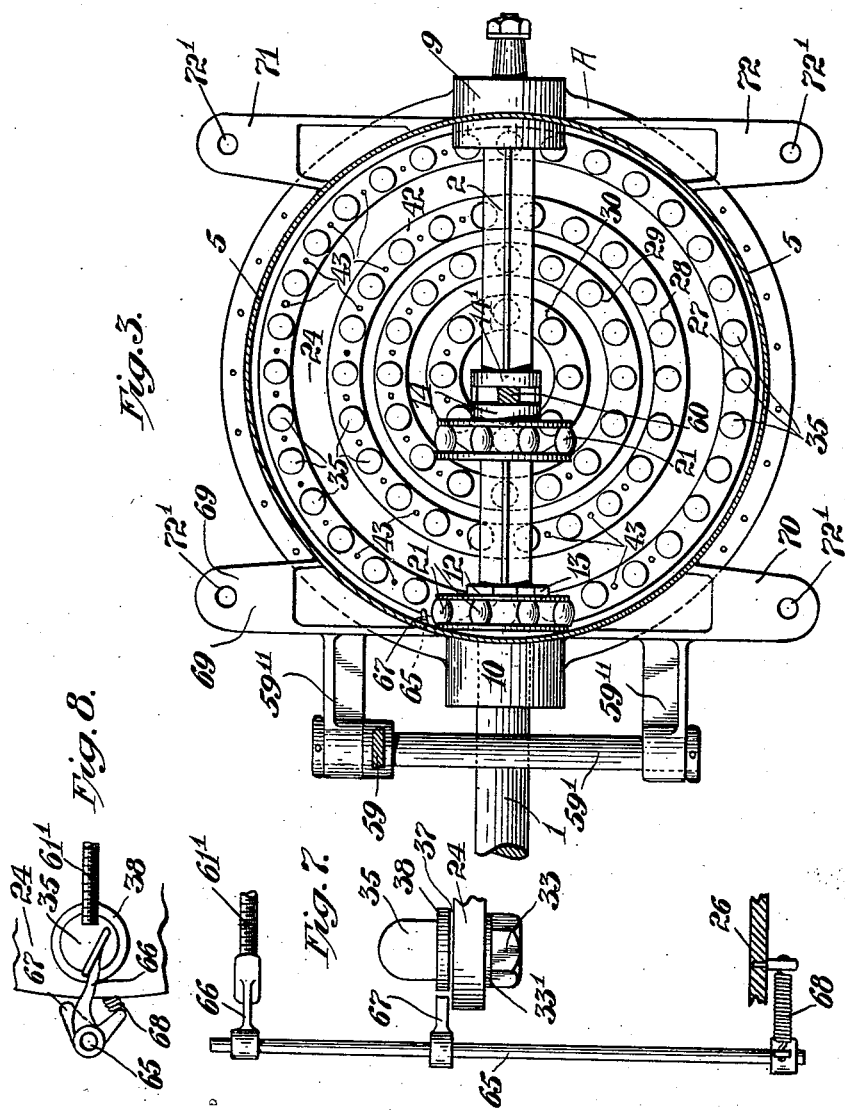

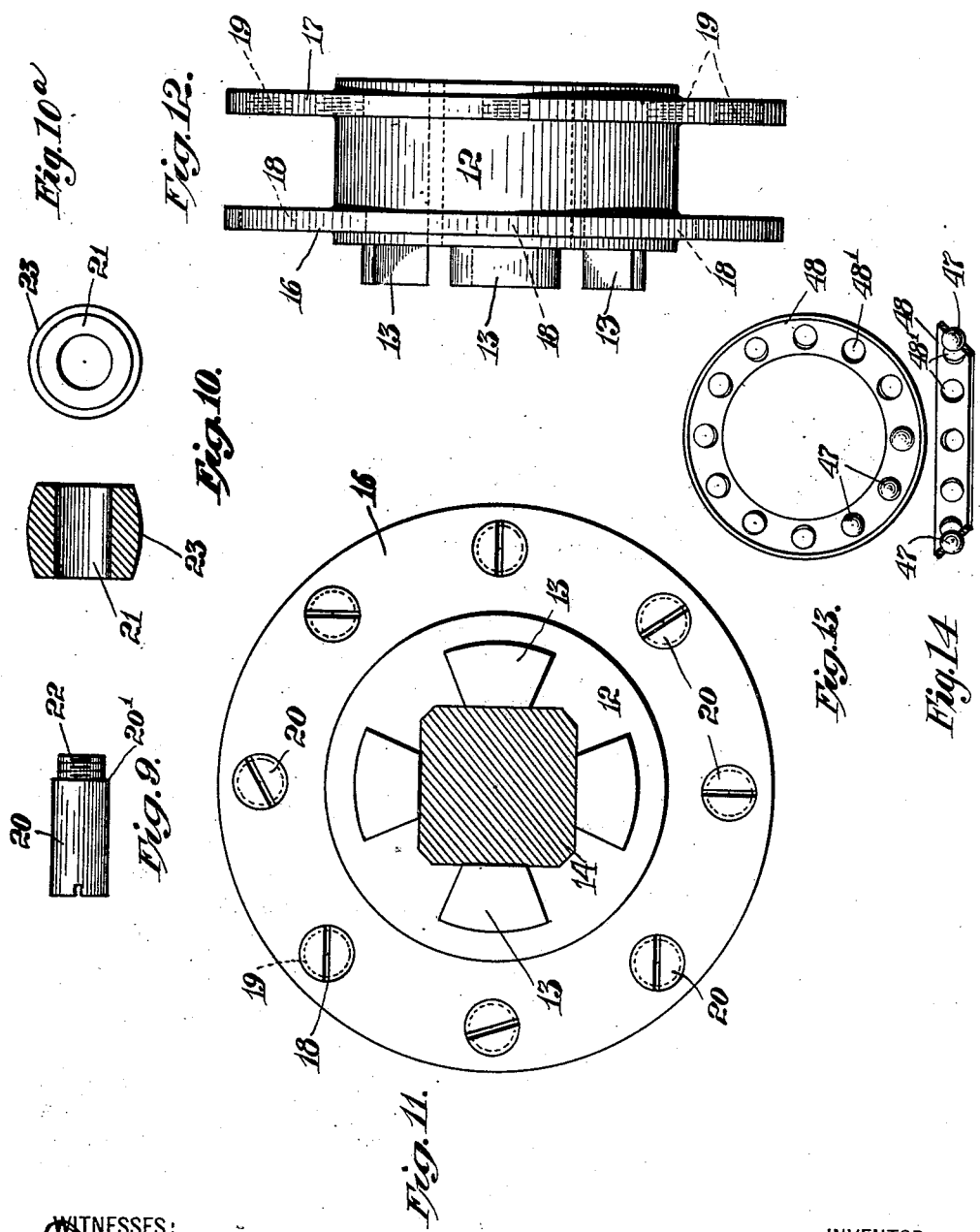

UNITED STATES PATENT OFFICE.

WILLARD IRVING TWOMBLY, OF NEW YORK, N. Y., ASSIGNOR, BY MESNE ASSIGNMENTS, TO TWOMBLY MOTORS COMPANY, OF NEW YORK, N. Y., A CORPORATION OF NEW YORK.

VARIABLE-SPEED POWER-TRANSMISSION MECHANISM.

1,018,219.  Specification of Letters Patent.  Patented Feb. 20, 1912.

Application filed March 12, 1910. Serial No. 548,776.

*To all whom it may concern:*

Be it known that I, WILLARD I. TWOMBLY, a citizen of the United States, residing in the borough of Manhattan, in the city, county, and State of New York, have invented a new and useful Improvement in Variable-Speed Power-Transmission Mechanism, of which the following is a specification.

This invention relates to variable speed power transmission mechanism, and it is the object of the invention to provide a mechanism of this character of the selective type, whereby variable forward and reverse speeds, and a direct drive, with no gears in operation, may be obtained.

It is a further object of the invention to provide a transmission mechanism that is simple, compact and cheap in construction, so that all parts may be easily assembled, and be efficient in operation.

It is a further object of the invention to provide a casing in which all of the mechanism of the transmission mechanism is inclosed, the said casing and operating mechanism being so constructed that it can be completely assembled and then secured in position in the frame of a vehicle, such as an automobile, for instance, it being readily removable for the purpose of making repairs or the substitution of another transmission mechanism.

In carrying out the invention I provide a drive and a driven shaft, pinions and clutch mechanism being connected to said shafts, and an intermediate gear comprising a wheel or disk having a plurality of sets of teeth in the form of pins or rollers, selective means being provided to throw the intermediate gear and pinions into mesh to transmit variable forward and reverse speeds to the driven shaft, or to a neutral or idle position, and to throw said intermediate gear and pinions out of mesh and the clutch mechanism into operative relation to couple the shafts for direct drive with no gears in mesh; all of which mechanism is operatively mounted in a casing.

In the drawings accompanying and forming a part of this specification, Figure 1 is a sectional side elevation of my improved power transmission mechanism, showing the intermediate gear out of operative relation with the drive and driven shafts, and the said shafts coupled together for direct drive. Fig. 2 is a view similar to Fig. 1, but illustrating the intermediate gear in operative relation with the drive and driven shafts, the outer circle of teeth or pins meshing with the pinion on the drive shaft, and the slidable pinion on the driven shaft as meshing with the innermost circle of teeth or pins on the intermediate gear in the rear of the axis thereof, to transmit slow reverse speed to the driven shaft; the said pinion on the driven shaft shown in dotted lines as meshing with the innermost circle of the teeth or pins on the intermediate gear forward of its axis to transmit slow forward speed to the driven shaft. Fig. 3 is a plan view, the top of the inclosing casing being broken away, illustrating the pinion on the drive shaft in mesh with the outer circle of teeth or pins, and the pinion on the driven shaft in mesh with one of the innermost circle of teeth or pins, of the intermediate gear to transmit slow forward speed to the driven shaft. Fig. 4 is a sectional detail of one of the teeth or pins of the intermediate gear. Fig. 5 is a sectional detail showing the manner of mounting the rockshaft and cam for throwing the intermediate gear into operative relation with the drive and driven shafts. Fig. 6 is a diagrammatic view to illustrate the rolling motion between the roller pinions and teeth of the intermediate gear. Fig. 7 is a detail of the mechanism for locking the intermediate gear in inoperative position when the drive and driven shafts are coupled for direct drive. Fig. 8 is a plan view of the parts shown in Fig. 7. Fig. 9 is a side elevation of one of the roller studs of the drive and driven shaft pinions. Fig. 10 is a sectional side elevation of one of the rollers of the drive and driven shaft pinions. Fig. 10ª is a sectional end elevation of one of the rollers of the drive and driven pinions. Fig. 11 is an enlarged end elevation of the pinion on the driven shaft. Fig. 12 is a view looking to the right of Fig. 11, but showing the rollers and studs removed. Fig. 13 is a sectional plan view of the ball separator for the ball bearing upon which the end of the stud of the intermediate gear rests. Fig. 14 is a sectional side elevation of the ball separator shown in Fig. 13; and Fig. 15 is an enlarged fragmentary sectional side elevation of the lower part of the casing and illustrating the bearings for the stud of the intermediate gear.

Similar characters of reference designate like parts throughout the different views of the drawings.

The form of the invention illustrated in the drawings, comprises a primary or drive shaft 1, connected to any suitable source of power preferably an internal combustion engine (not shown), and a coaxial driven shaft 2, the drive shaft 1 having a socket in the end with a bushing 3 therein, the end of the drive shaft 2 being turned down, as at 4, and engaging in the bushing 3 in the end of the drive shaft to rotate therein. The said shafts 1, 2 are journaled in the upper section 5 of a casing (designated in a general way by A), and comprise any suitable bearing, illustrated in the present instance as the well known "Timken roller bearing", consisting of a sleeve 6 driven on the shaft and a ring 7, tapered or conical rollers being interposed between said sleeve 6 and ring 7. The journal boxes for said bearings are formed or cast integral with the upper section 5 of the casing and are in the nature of hubs 8, 9, the ends of which are internally screw threaded and screw threaded caps or covers 10, 11, mounted on the shafts 1, 2, engaging in said ends to make a substantially closed structure.

Fixed upon the end of the shaft 1 to rotate therewith within the casing A is a roller pinion 12, one face, as 13, of which is constructed as one member of a clutch. Mounted on the driven shaft 2 to rotate therewith and to have sliding movement thereon within the casing is a roller pinion 14, one face, as 15, of said pinion being constructed to form the other member of the clutch. To permit the pinion 14 to slide on the drive shaft 2 and also rotate therewith I form the shaft square in cross section, as clearly shown in section in Fig. 11. As both of the roller pinions 12, 14, are constructed substantially similar, for convenience I will only describe the construction of one.

The roller pinions 12, 14 comprise a hub portion whereby they are mounted upon their respective shafts, and have a pair of annular flanges 16, 17. In the flange 16 is a circle of evenly spaced holes 18, and in the flange 17 is a concentric circle of screw threaded holes 19 which are opposite the holes 18 in the flange 16 and spaced at the same distance. The spacing of the holes 18, 19 is in accordance with the pitch of the pinion desired. Engaging in said holes 18, 19 are studs 20 upon which the rollers 21 are rotatively mounted, said studs being provided with a shoulder 20' and a screw-threaded portion 22 which engages in the screw-threaded holes in the flange 17. The rollers 21 are of convex or barrel shape, that is, bellying out at the center, as at 23. (Fig. 10.)

The intermediate gear for transmitting power from the drive to the driven shaft comprises a wheel or disk 24 having a stud 25 whereby it is rotatably mounted in the lower section 26 of the casing A with its axis transverse to the axes of the shafts 1, 2. Fixed in said wheel 24 to project up from the face thereof are a plurality (in the present instance shown as four in number) of concentric circles of pins 27, 28, 29 and 30, which are provided with a shoulder 31 and a screw-threaded end 32 passing through the wheel 24, a nut 33 engaging with said screw-threaded end, and a washer 33' interposed between the nut and wheel, to securely fasten the pins in the wheel; the upper ends of the pins are in the form of a cone 34. Rotatably mounted on the projecting ends of the pins are caps 35, said caps formed with a conical recess 36, but the inclined surfaces of said recess are at a different angle to the inclined surfaces of the cone portion 34 of the pins, so that the bearing of the said caps upon the pins will be at the apex 36' of the cone portions, and the side walls of the pins, with a clearance space between the cone portions. The caps are of such a length that there will be a small clearance 37 between the said caps and face of wheel 24 and will have no bearing whatever upon the face of the wheel. The caps are also provided with flanges 38 to be engaged by rings 39, 40, 41 and 42 having a circle of holes through which the caps project, said rings secured to the wheel 24 in any suitable manner, as by screws 43. The construction and connection of pins or teeth to the wheel 24 is clearly illustrated in Fig. 4.

The wheel 24 has a combined ball and roller bearing in the lower section 26 of the casing A, and comprises a bushing 44 secured in a hub 45 formed integral with the casing section 26. In said bushing 44 is mounted for sliding movement a cup 46 carrying a circle of balls 47, the balls being separated by a frame 48 having a circle of holes 48' in which the balls engage (Fig. 13). A ring 49 rests upon the balls and has a circumferential groove 49' forming a raceway for the said balls. The lower end of the stud 25 rests directly upon the ring 49. The roller bearing for the stud 25 comprises a hardened sleeve 50 shrunk onto the said stud, a ring 51 setting in an annular recess 52 in the bushing 44 and provided with recesses in which engage rollers 53, the said rollers 53 bearing between the ring 51 and the sleeve 50 on the stud, the lower ends resting upon the walls of the recesses 52 in the bushing.

The means for throwing the intermediate gear into and permitting it to drop out of mesh with the pinions on the drive and driven shafts comprises a rock-shaft 54 journaled in a cap 55, said cap being screw-threaded and adapted to engage with the hub 45 on the lower case section 26 to constitute a part thereof. Mounted upon the rock shaft 54 within said cap 55 is a cam 56 engaging with the stud-carrying cup 46, a crank or arm 57 being secured to the shaft 54 outside of the cap 55. Connected to said arm is a link 58, one end of which is secured to an actuator or operating lever 59, said lever secured upon a shaft 59' journaled in arms 59'' forming a part of the casing A; said lever having a foot rest 59ª.

The means for sliding the pinion 14 on the shaft 2 to throw it into or out of mesh with either one of the circles of intermediate-gear teeth forward or back of the axis of said gear, or to a neutral position substantially above the axis thereof, comprises a yoke 60 engaging with a groove 60' in the hub 14' of said pinion 14. A rod 61 passes through the wall of the upper case-section 5, and has a screw threaded end 61' whereby it is secured to said yoke 60; a pivoted operating lever or actuator 62 is pivotally secured to the end of the rod 61 outside of the casing A. The lever 62 is provided with a hand-operated latch 63 to engage with notches 64 in a fixed rack 64', to lock the pinion in either one of its selected positions. This means also serves to throw the clutch portion of the pinions 12, and 13 into mesh to drive the driven shaft directly from the drive shaft. The said pinion 14 when in such position engages over the connection of the drive and driven shafts where the turned-down portion 4 of the driven shaft engages in the bushing 3. When the pinions are in this position it is essential that the intermediate gear is out of mesh therewith and locked in such position. This is effected by releasing the lever 59 when the gear 24 will automatically return to idle position. The means for locking said gear in such position comprises a rock-shaft 65 mounted in the casing A transverse to the axis of shafts 1 and 2, to which is connected a lug or ear 66 engaged by the extension 61' of the rod 61, when the clutch portions 13, 15 of the pinions are in engagement, a finger 67 on said rod thereby being caused to rock over the face of the wheel 24, thus preventing any upward movement of said gear. When the clutch portions 13, 15 of the pinions 12, 14 are thrown out of engagement the finger 67 is caused to swing away from the gear by a spring 68 connected to said rock-shaft 65, and the intermediate gear may again be thrown into mesh with the pinions by the actuator 59. (Figs. 1, 7, and 8.)

All of the operating mechanism is inclosed in the casing A, comprising the upper section 5 and lower section 26, the transmission mechanism also being secured in position to the frame of a vehicle, such as an automobile, by means of said casing, and for this purpose it is provided with arms 69, 70, 71, 72, provided at the outer extremities with bolt holes 72' in which engage bolts whereby to fasten it to the frame of the vehicle. While I have shown this casing so constructed as to be adapted to form a part of a vehicle, I do not limit the invention for this use, as it is obvious that a transmission mechanism of this character may be readily adapted for different purposes. The casing is also provided with a removable cover 73 secured in any suitable manner, as by screws 73'. By means of this cover access may be had to the operating mechanism of the transmission mechanism for the purpose of supplying lubricant or any other purpose. The cap 55 has a tight joint connection with said casing, to prevent the oozing out or dripping of lubricant.

In Fig. 6 I have illustrated diagrammatically the action of the rollers of the roller pinions with the teeth of the intermediate gear, the dot-and-dash line B representing the pitch line of one of the set of teeth in the intermediate gear, and the dot-and-dash line C representing the pitch line of the pinion. In the lower portion of said figure, a tooth 35 of the intermediate gear is shown as coming into mesh with the pinion, the dotted line 35' representing a further forward movement of the intermediate gear, and at 35'' the tooth is shown as being in mesh with the pinion. At 74, the dotted line represents the tooth 35 as just going out of mesh with the pinion, and in full lines as entirely out of mesh therewith. From this figure it will be observed that the pinion-rollers and the teeth of the intermediate gear have always a rolling engagement, thus preventing any objectionable chattering therebetween.

The operation of the mechanism is substantially as follows: Assuming the parts to be in the Fig. 1 position, in which the clutch portions of the pinions 12, 14 are in mesh, the driven shaft 2 being driven directly from the primary or drive shaft 1; the intermediate gear 24 is out of mesh with said pinions and locked in such position by the finger 67 on rock shaft 65 engaging over the face of said intermediate gear, and held in such position by the end 61' of the rod 61 engaging with the arm 66 on the rock-shaft 65; the clutch portions of the pinions are locked in such position by the latch 63 of the operating lever 62 engaging with the rearmost notch 64 in the rack 64'.

In Fig. 2 the intermediate gear is shown as being in mesh with the pinions on the drive and driven shafts and locked in mesh by the ball-carrying cup 46 in which is rotatably mounted the gear stud 25, resting upon the cam 56 directly on a dead center line. The pinion 12 on the drive shaft, when the intermediate gear is meshing with the pinions 12, 14, always meshes with the outer circle or set of teeth thereon, while the pinion 14 may mesh with either one of the inner circles or sets of teeth, either forward or back of the axis of this intermediate gear 24, or be in a neutral or idle position substantially over the axis of the said intermediate gear; the said pinion is thrown to any of such positions by the operating lever 62, and rod 61 connected to said pinion and locked in either of such positions by the latch 63 engaging in one of the notches 64 in the rack 64'.

In Fig. 2 the pinion 14 is shown in full lines as meshing with the inner circle or set of teeth on the intermediate gear 24 in the rear of the axis thereof, to transmit slow reverse speed to the driven shaft 2. In the dotted line position the said gear 14 is shown in mesh with the inner circle or set of teeth forward of the axis of the intermediate gear 24, (as also shown in plan in Fig. 3,) to transmit slow forward speed to the driven shaft 2.

The circles or sets of teeth on the intermediate gear in the present instance are so proportioned that when the driven shaft pinion is in mesh with the innermost teeth the ratio of the drive shaft to the driven shaft will be 4 to 1; when in mesh with the second set of teeth the ratio will be at 2½ to 1; and when in mesh with the third set of teeth, at a ratio of 2 to 1. The same reverse speeds may be transmitted to the driven shaft. While I have shown the teeth on the intermediate gear so proportioned as to give a ratio of the drive and driven shaft as above mentioned it will be readily understood that the teeth may be so proportioned as to give any desired speed to the driven shaft relative to the drive shaft, and that the size of wheel 24 and the number of circles or sets of teeth may be increased to increase the number of variable speeds obtainable.

Owing to the construction of the rollers of the pinions, and the convexed formation of the teeth on the intermediate gear, when said gear is thrown into mesh with the pinion, there will be no possibility of clashing of the teeth, the said teeth rolling, so to speak, into mesh. It will also be observed that when the driven shaft is being driven directly, that is, when the clutch portions of the pinions are in mesh and the drive and driven shafts coupled, there are no gears whatever in mesh.

While I have shown the teeth on the intermediate gear as having caps or rollers 35, it will be readily understood that the heads of the fixed pins may be made of convex construction, and have practically the same rolling effect with the rollers of the pinions 12, 14.

Variations may be resorted to within the scope of the invention, and portions of the invention may be used without others.

Having thus described my invention, I claim:

1. In a variable speed power transmission mechanism, the combination of a drive shaft; a roller pinion fixed thereto, said pinion also constituting one member of a clutch; a driven shaft coaxial with the drive shaft; a roller pinion mounted on the driven shaft to rotate therewith and have sliding movement thereon, said pinion also constituting one member of a clutch; an intermediate gear the axis of which is transverse to the axes of the drive and driven shafts, comprising a wheel having a plurality of concentric circles of pins; means operative to throw and lock the said wheel into mesh with the pinions on the drive and driven shafts, and to permit it to drop out of mesh with the pinions; means to lock said wheel out of mesh with the pinions; and means to throw and lock the pinion on the driven shaft into and out of mesh with either circles of pins on the intermediate wheel to transmit different forward and reverse velocities to the driven shaft, or to throw the clutch portion of said pinion into engagement with the clutch portion of the drive-shaft pinion for direct drive, and simultaneously with the throwing of the clutch portions of the pinions into engagement operating the means to lock the intermediate wheel out of mesh with the pinions.

2. In a variable speed power transmission mechanism, the combination of a drive shaft; a roller pinion fixed thereto; a driven shaft, coaxial with the drive shaft and having a bearing in the end of said shaft; a roller pinion mounted on the driven shaft to rotate therewith and have sliding movement thereon; an intermediate gear comprising a wheel having a plurality of concentric circles of pins; means operative to throw and lock said intermediate gear into mesh with the drive and driven shaft pinions, and to permit it to drop out of mesh therewith; and a lever connected to the pinion on the driven shaft to throw it into and out mesh with either one of the circles of pins on the intermediate gear; and means to lock the intermediate wheel out of mesh with the pinions.

3. In a variable speed power transmission mechanism, a drive shaft, a roller pinion connected to said shaft, a driven shaft, a roller pinion connected to said driven shaft to have sliding movement thereon, an intermediate gear comprising a disk having a plurality of concentric circles of fixed pins on its plane surface, rotatable caps on said pins, having flanges at their lower ends, rings having a series of holes to engage over the caps and secured to the intermediate wheel to retain the caps in place; and means to throw the intermediate gear into mesh with the roller pinions.

4. In a variable speed power transmission mechanism, a drive shaft, a roller pinion connected to said shaft, a driven shaft, a roller pinion connected to the driven shaft to have sliding movement thereon, each of said pinions constructed to form one member of a clutch, an intermediate gear comprising a disk having a plurality of concentric circles of pins, means to throw and lock the intermediate gear into mesh with the pinions, means to throw and lock the driven shaft pinion into and out of mesh with either one of the circles of pins on the intermediate gear, or throw and lock the clutch portions of the pinions into mesh to drive the driven shaft directly from the drive shaft.

5. In a power transmission mechanism, the combination of a drive shaft, a roller pinion connected to said shaft, a driven shaft, a roller pinion mounted on the driven shaft to rotate therewith and have sliding movement thereon, an intermediate gear comprising a wheel or disk having a plurality of concentric circles of pins, and caps mounted for rotary movement upon the pins; the rollers of the pinions being convexed or barrel shaped, and the pin caps also being convexed so that the pinion rollers and caps will always have a rolling engagement to prevent chattering therebetween.

6. In a power transmission mechanism, the combination of a drive shaft, a roller pinion connected thereto, a driven shaft, a roller pinion mounted thereon to rotate therewith and also have sliding movement thereon, an intermediate gear having a plurality of circles of pins to mesh with the pinions on the drive and driven shafts to transmit variable speeds to the driven shaft; said roller pinions comprising a hub portion having a pair of concentric flanges, studs secured between said flanges, and rollers rotatively mounted on said studs, the said rollers being barrel shaped or bellying out at the center, one face of the hub also forming one member of a jaw-clutch; and means connected to the pinion on the driven shaft to throw it into mesh with either one of the circles of pins on the intermediate gear, or to throw the clutch portion into and out of engagement with the clutch portion of the pinion on the drive shaft.

7. In a power transmission mechanism, the combination of a drive shaft, a roller pinion connected thereto, a driven shaft, a roller pinion mounted on the driven shaft to rotate therewith and also have sliding movement thereon, an intermediate gear comprising a wheel or disk having a plurality of circles of studs or pins fixed thereto, said pins having conical heads, caps rotatively mounted on the studs and having a conical recess so that the apex of the conical head of the studs will engage with the apex of the conical recess in said caps, said caps also provided with a flange, rings having a series of holes, one ring for each circle of studs on the intermediate gear, to engage with the flanges of the caps and secured to the wheel or disk to retain the caps in place, and means operative to throw and lock said intermediate gear into mesh with the drive and driven shaft pinions, and to permit it to drop out of mesh therewith.

8. In a power transmission mechanism, the combination of a drive shaft, a driven shaft, roller pinions connected to said shafts, an intermediate gear for transmitting variable speeds to the driven shaft, a casing in which said gear is rotatably mounted for sliding movement transverse to the axis of the drive and driven shafts, a rock-shaft journaled in said casing below the gear, a cam on said shaft to engage with the gear, and an operating lever connected to said rock-shaft to rock said cam to throw the intermediate gear into operative relation with the drive and driven shafts.

9. In a variable speed power transmission mechanism, the combination of a drive shaft, a roller pinion connected thereto, said pinion constructed to form one member of a jaw-clutch, a driven shaft, a roller pinion mounted on the driven shaft to rotate therewith and have sliding movement thereon, said pinion constructed to form the other member of said jaw-clutch, and an intermediate wheel or disk having a plurality of concentric circles of fixed pins, caps having flanges rotatively mounted on said pins, means engaging over the caps and secured to the wheel to retain the caps in place; the pinion on the drive shaft engaging with the outer circle of pins, and the pinion on the driven shaft engaging with either one of the circles of pins to transmit variable forward and reverse speeds thereto; means to throw and lock said pin wheel into mesh with said pinions; means to throw and lock the clutch portions of the pinions into operative relation when the pin wheel is out of engagement with the pinions; and means operative by the last-mentioned means to lock the intermediate wheel out of mesh with the driven and drive shaft pinions when the clutch portions of said pinions are in engagement.

10. In a power transmission mechanism, a drive shaft, a driven shaft, pinions connected to said shafts, an intermediate gear for transmitting variable speeds to the driven shaft, a casing comprising an upper and a lower section, the drive and driven shafts journaled in the upper section; the intermediate gear journaled in the lower section to rotate about an axis transverse to the axis of the drive and driven shafts, and also having sliding movement transverse to the axis of said shafts, and means mounted in the lower section operative to impart sliding movement to said gear to throw it into operative relation with the drive and driven shafts and to lock it in said position.

11. In a power transmission mechanism, the combination of a drive and a driven shaft; roller pinions connected thereto, each of said pinions constructed to form one member of a jaw-clutch; a wheel or disk having a plurality of circles of pins; means to throw and lock said wheel into operative relation with the pinions on the driven and drive shafts; and means connected to the pinion on the driven shaft to throw it into and out of mesh with either one of the circles of pins on the wheel to impart variable forward and reverse speeds to the driven shaft, and to throw the clutch portions of the pinions into operative engagement to drive the driven shaft directly from the drive shaft, and simultaneously therewith lock the wheel out of mesh with the pinions.

12. In a power transmission mechanism, a drive shaft; a gear connected thereto; said gear constructed to form one part of a clutch; a driven shaft, a sliding gear mounted on the driven shaft to rotate therewith and constructed to form the other member of said clutch; an intermediate gear comprising a wheel or disk having a plurality of concentric circles of pins; means operative to throw said intermediate gear into operative relation with the gears on the drive and driven shafts and to permit it to drop out of mesh therewith; and means to throw the clutch members of the gears on the drive and driven shafts into and out of operative relation, and simultaneously with the throwing of said clutch into operative relation locking the intermediate gear out of engagement with said gears; and selective means for throwing the sliding gear on the driven shaft into and out of mesh with either one of the circles of pins on the pin wheel, whereby to procure different speeds forward and the same speeds on the reverse with the highest speed forward when the clutch portion of the gears on the drive and driven shafts are in mesh.

13. In a power transmission mechanism a drive shaft; a pinion connected thereto; a driven shaft; a pinion connected thereto for movement along the axis thereof; an intermediate gear for transmitting variable speeds to the driven shaft; a casing comprising two sections inclosing the pinions and intermediate gear; the drive and driven shafts journaled in the upper section and the intermediate gear journaled in the lower section, a rock shaft journaled in the lower section, a cam fixed thereon within the casing to engage the journal of the intermediate gear, and an operating lever connected to said rock-shaft whereby to throw the intermediate gear into mesh with the pinions on the drive and driven shafts.

14. In a power transmission mechanism, the combination of a drive shaft; a roller pinion connected to the drive shaft; a driven shaft; a roller pinion connected to the driven shaft and having sliding movement thereon, each of the pinions forming one member of a clutch; an intermediate gear having a plurality of concentric circles of pins on its plane surface to mesh with the pinions on the drive and driven shafts; means to throw and lock said intermediate gear into mesh with said pinions, the pinion on the drive shaft meshing with the outer circle of pins forward of the axis of the intermediate gear; means to throw and lock the pinion on the driven shaft into mesh with either one of the inner circles of pins forward of the axis of the intermediate gear to transmit variable forward speeds to the driven shaft, or to throw said pinion into mesh with either one of the circles of pins in the rear of the axis of the intermediate gear to transmit variable reverse speeds to the driven shaft, or to a neutral position substantially over the axis of said intermediate gear; or to throw and lock the clutch portions of the pinions into mesh whereby to drive the driven shaft directly from the drive shaft, and means operative by the sliding pinion shifting mechanism to lock the intermediate gear out of mesh with the pinions when the clutch portions of the pinions are thrown into engagement.

15. In a variable speed power transmission mechanism, the combination of a drive shaft; a pinion connected to the drive shaft and forming one member of a clutch; a driven shaft; a pinion mounted on the driven shaft to rotate therewith and have sliding movement thereon; said pinion forming the other member of said clutch; an intermediate gear comprising a disk having a plurality of circles of pins on the face thereof; means to throw the pinion on the driven shaft into mesh with either one of the circles of pins on the intermediate gear forward of its axis to transmit variable forward speeds to the driven shaft, and into mesh with either of the circles of said pins in the rear of the axis of the intermediate gear to transmit variable reverse speeds to the driven shaft, and to throw the clutch portions of the pinions into operative relation to drive the driven shaft direct from the drive shaft; said means comprising a yoke to engage with the hub of the said pinion, a rod connected to said yoke, and a pivoted operating lever connected to the rod; means operative to throw the intermediate gear into, or to permit it to drop out of, mesh with the pinions; and means operative when the clutch portions of the pinions are thrown into operative relation for direct drive to lock the intermediate gear out of mesh with the pinions.

16. In a variable speed power transmission mechanism, the combination of a drive shaft; a pinion connected to the drive shaft; a driven shaft, a pinion mounted on the driven shaft to rotate therewith and also have sliding movements thereon, each of the pinions being constructed to form one member of a clutch; an intermediate gear comprising a wheel having a plurality of circles of pins; means to throw said gear into mesh with the drive and driven shaft pinions; means to throw the pinion on the driven shaft into and out of mesh with the circles of pins on the intermediate gear forward or back of the axis of said gear, or the clutch portions of the pinions into engagement; said means comprising a yoke engaging over the hub of said pinion, a rod one end of which is connected to and projects through said yoke, and a pivoted operating lever connected to the other end of said rod; and means for locking said intermediate gear out of mesh with the pinions when the clutch portions of the pinions are in engagement comprising a rock-shaft extending transversely of the drive and driven shafts and having a pair of ears, one of which is engaged by the end of the rod extending through the yoke of the driven pinion, and the other ear engaging over the intermediate gear, and a spring for returning said rock-shaft when released.

17. In a variable speed power transmission mechanism the combination of a drive shaft; a driven shaft; pinions connected thereto; an intermediate gear having a plurality of circles of pins to mesh with the drive and driven shaft pinions; and a casing inclosing all of the operative parts comprising an upper section in which the drive and driven shafts are journaled, a lower section in which the intermediate gear is journaled, said lower section releasably connected to the upper section, and a removable cover whereby access may be had to the operative parts of the transmission.

18. In a variable speed power transmission mechanism the combination of a drive shaft; a driven shaft; pinions connected thereto; an intermediate gear comprising a wheel having a plurality of circles of pins to mesh with the drive and driven shaft pinions and a stud; and a casing for inclosing all of the operative parts of the transmission comprising an upper section in which the drive and driven shafts are journaled, and a lower section in which the stud of the intermediate gear is journaled, said intermediate gear journal comprising a combined ball and roller bearing.

19. In a variable speed power transmission mechanism the combination of a drive shaft; a driven shaft; pinions connected thereto; an intermediate gear comprising a wheel having a plurality of circles of pins to mesh with the drive and driven shaft pinions and also provided with a stud; and a casing for inclosing all of the component parts of the transmission mechanism comprising an upper section in which the drive and driven shafts are journaled, and a lower section in which the stud of the intermediate gear is journaled, said journal comprising a bushing secured in the casing, a cup carrying balls in said bushing and upon which the end of the stud rests, and a roller bearing also mounted in the bushing to engage the sides of the stud.

20. In a variable speed power transmission mechanism, the combination of a drive shaft and a driven shaft, the axes of which are coaxial; roller pinions connected to said shafts, each of the pinions forming one member of a jaw clutch; an intermediate gear having a plurality of circles of teeth; means to throw and lock said intermediate gear into, or permit it to drop to idle position out of, mesh with the pinions; selective mechanism to change the relation of the pinion on the driven shaft to the intermediate gear to transmit variable forward and reverse speeds to the driven shaft, or to throw the clutch portions of the pinions into engagement to transmit motion to the driven shaft directly from the drive shaft with no gears in mesh; and means operative by the selective mechanism when the clutch portions of the pinions are thrown into engagement to lock the intermediate gear out of mesh with the pinions.

21. In a variable speed power transmission mechanism, the combination of a drive and a driven shaft; pinions and clutch mechanism connected to said shafts; an intermediate wheel having a plurality of circles of teeth; means to throw and lock the intermediate gear into, or permit it to drop cut of, mesh with the pinions; selective mechanism to throw the pinion on the driven shaft into mesh with either one of the circles of teeth either forward or back of the center of the intermediate wheel to transmit variable forward and reverse speeds to the driven shaft, or throw the clutch mechanism into operative relation to couple the drive and driven shafts for direct drive with no gears in mesh, and simultaneously locking the intermediate wheel out of mesh with the pinions; and a casing in which all of said mechanism is operatively mounted.

WILLARD IRVING TWOMBLY.

Witnesses:
PAULA PHILIPP,
PERCY A. SMITH.